(No Model.)
E. A., F. S. & H. G. KEASEY.
ROAD CART.
No. 485,763. Patented Nov. 8, 1892.
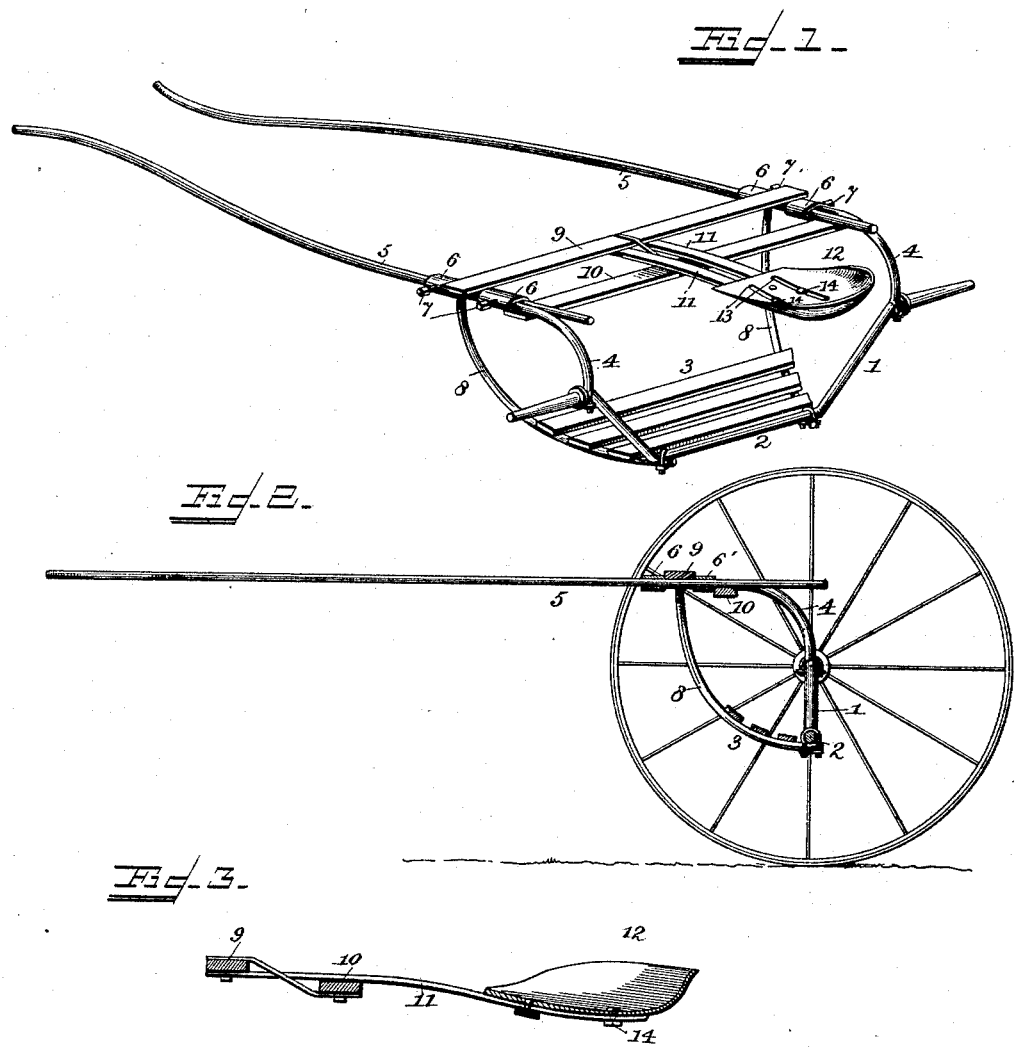
Witnesses
Chas. H. Durand
N. P. Riley
Inventors
E. A. Keasey,
F. S. Keasey,
H. G. Keasey,
By their Attorneys,
C. A. Snow & Co.

UNITED STATES PATENT OFFICE.

ENOS A. KEASEY, FRED S. KEASEY, AND HARRY G. KEASEY, OF LIGONIER, INDIANA.

ROAD-CART.

SPECIFICATION forming part of Letters Patent No. 485,763, dated November 8, 1892.

Application filed February 16, 1892. Serial No. 421,707. (No model.)

*To all whom it may concern:*

Be it known that we, ENOS A. KEASEY, FRED S. KEASEY, and HARRY G. KEASEY, citizens of the United States, residing at Ligonier, in the county of Noble and State of Indiana, have invented a new and useful Road-Cart, of which the following is a specification.

The invention relates to improvements in road-carts.

The object of the present invention is to provide a road-cart which will be especially adapted for speeding and breaking horses, and which may be readily adjusted to suit a horse, and which will enable a driver to leave the vehicle safely and readily in case a horse should become unmanageable.

The invention consists in the construction and novel combination and arrangement of parts hereinafter fully described, illustrated in the accompanying drawings, and pointed out in the claims hereto appended.

In the drawings, Figure 1 is a perspective view of a road-cart constructed in accordance with this invention. Fig. 2 is a sectional view taken longitudinally of one of the shafts. Fig. 3 is a detail sectional view of the seat.

Like numerals of reference indicate like parts in all the figures of the drawings.

1 designates a drop-axle having a central bend 2, to which is attached the rear end of a foot-board 3, and to which are also secured curved bracket-bars 4, which serve as means for connecting the shafts 5 with the axle. The curved bracket-bars extend upward from the axle and are located adjacent to the bend 2, and are provided at their front ends with sleeves 6, in which are arranged the shafts 5, which may be moved longitudinally to adjust themselves to the size of a horse, and which are secured in their adjustment by set-screws 7. The front ends of the side bars 8 of the foot-board extend upward and are secured to the front ends of the bracket-bars. The bracket-bars are connected near their front ends by cross-bars 9 and 10, to which are secured longitudinally-disposed seat-bars 11, on the rear ends of which is adjustably secured a seat 12. The seat 12 is provided with longitudinal slots 13, in which are arranged set-screws 14, which secure the seat in its adjustment and enable the cart to be readily balanced by adjusting the weight over the axle.

The drop-bend in the axle brings the feet of the driver close to the ground, and in case an animal should become unmanageable the driver can safely leave the vehicle by merely stepping backward to the ground.

We desire to be understood that we do not limit ourselves to the precise details of construction herein shown and described, as we may, without departing from the spirit of the invention, make minor changes therein, as the adjustable shafts may be used independently of the adjustable seat and the particular construction of the axle and foot-board, and the adjustable seat may also be used on other vehicles not provided with the other improvements herein described.

What we claim is—

1. In a two-wheeled vehicle, the combination of an axle having a drop-bend, shafts having their rear ends connected to the axle on opposite sides of the bend, a foot-board having its rear end secured to the axle at the bottom of the bend and having its front suspended from the shafts, cross-bars connecting the shafts near their rear ends, and an adjustable seat extending rearward from the cross-bars and arranged over the axle, substantially as described.

2. In a two-wheeled vehicle, the combination of an axle, the curved bracket-bars extending forward from the axle and provided with sleeves, longitudinally-adjustable shafts arranged in the sleeves, and set-screws mounted on the sleeves and securing the shafts in their adjustment, substantially as described.

In testimony that we claim the foregoing as our own we have hereto affixed our signatures in the presence of two witnesses.

ENOS A. KEASEY.
    FRED S. KEASEY.
    HARRY G. KEASEY.

Witnesses:
 P. V. HOFFMAN,
 ALEX. MCENTERFFOR.